United States Patent [19]

Lapierre

[11] Patent Number: 4,471,561

[45] Date of Patent: Sep. 18, 1984

[54] INSECT ERADICATOR

[76] Inventor: John A. Lapierre, Wigwam Rd., West Brookfield, Mass. 01583

[21] Appl. No.: 401,139

[22] Filed: Jul. 23, 1982

[51] Int. Cl.³ ............................................. A01M 1/22
[52] U.S. Cl. ...................................... 43/108; 43/112; 47/23; 361/232
[58] Field of Search ............... 43/108, 98; 47/24, 23; 361/232; 72/112

[56] References Cited

U.S. PATENT DOCUMENTS

| | | | |
|---|---|---|---|
| 616,049 | 12/1898 | Archer. | |
| 909,814 | 1/1909 | Norris | 43/98 |
| 2,170,822 | 8/1939 | Kirkpatrick | 43/108 |
| 2,593,781 | 4/1952 | Meis | 43/108 |
| 3,366,854 | 1/1968 | Robinson | 361/232 |
| 3,935,662 | 2/1976 | Hamid | 43/112 |
| 4,118,752 | 10/1978 | Iguchi | 361/232 |
| 4,248,005 | 2/1981 | Hedstrom | 43/112 |
| 4,299,048 | 11/1981 | Bayes | 43/98 |
| 4,387,529 | 1/1983 | Hedstrom | 43/112 |

Primary Examiner—Gene P. Crosby
Attorney, Agent, or Firm—Blodgett & Blodgett

[57] ABSTRACT

An insect exterminator having a base sheet of electrical insulating material, a source of electrical power, a first electrical contact extending along the length of the sheet, and a second electrical contact spaced from the first contact and also extending along the length of the sheet. The first and second electrical contacts are connected to the source of electrical power, so that a circuit is completed across the contacts only through an insects body as the insect attempts to traverse the contact.

3 Claims, 7 Drawing Figures

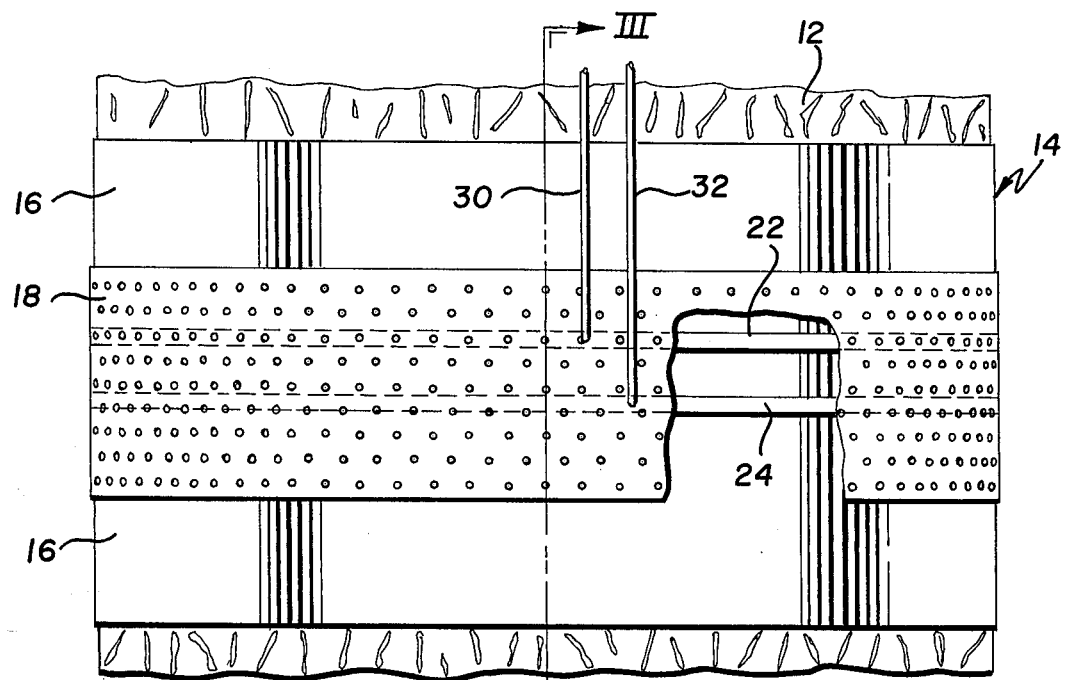
Fig. 2
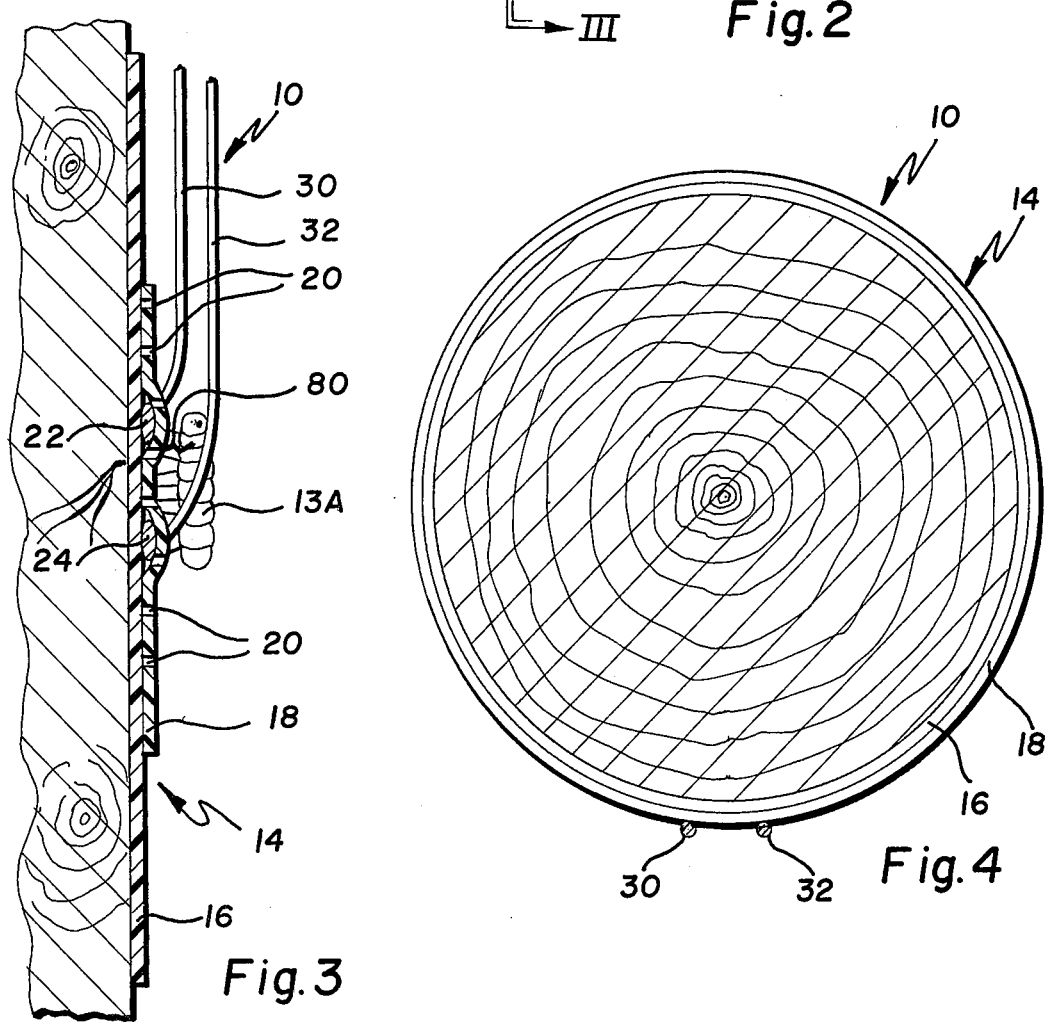
Fig. 3
Fig. 4

INSECT ERADICATOR

BACKGROUND OF THE INVENTION

The invention is generally directed to a device for eradicating insects through the use of electricity. The invention is specifically directed to a device for protecting trees and shrubs from injurious insects by electrocuting the insects as they attempt to climb the trunk of the tree or shrubs.

The control of insects is one of man's oldest problems, particularly in the area of agriculture and in cases where the insects are of the type which transmit disease or are parasites of man.

During modern times, the most affective controls of insects have been through the use of toxic chemicals or insecticides. However, the use of insecticides has had serious side effects, such as the simultaneously killing of beneficial insects such as bees and insects which are predators of other insects. The widespread use of insecticides, particularly in aerial spraying has resulted in the killing of other wild life, such as birds. Also, after prolonged use of the insecticide, the insects which are being controlled develop an immunity to the insecticide.

More recently, efforts have been made to control insects through biological means which do not at the same time harm beneficial insects or other wild life. Examples of such biological controls are the use of bacteria, which affects only the specific insect being controlled, and traps which are provided with olfactory lures. The biological controls are not the complete answer either. The environment is protected; however, not all insects can be controlled in this way and, in many cases, the control is not completely effective.

Some species of insects have resisted all attempts to control them. One of the most troublesome is the caterpillar, particularly the gypsy moth species which has recently completely defoliating millions of acres of forest in the northeast section of the United States. The gypsy moth caterpillar has been attacked on all fronts. While in the egg stage, the eggs, which are layed in masses, are scraped off the tree, or dabbed with a toxic penetrating agent, such as creosote. When the caterpillars are in the first larval stages, they are susceptible to a lethal intestional bacteria which is applied in a spray. At a later stage, the caterpillar is no longer affected by the bacteria and a variety of toxic chemicals are used, which although is effective, it is not effective enough to completely control the caterpillars and at the same time, results in the killing of other wildlife.

The last of defense against the ravages of the caterpillars involves the efforts of individual home owners to save individual trees.

One of the most common methods of protecting an individual tree from caterpillars is the application of a band of sticky tape or metal foil with a sticky substance attached thereto around the circumference of the tree. Eventually, so many caterpillars become entangled in the sticky substance that other caterpillars can then climb over them and proceed up the tree. Also, if the caterpillars are frustrated in their attempt to go up the tree, they may descend and proceed to another tree.

Insect exterminators have also been developed which utilize electric power as the killing agent. The electrical exterminator is essentially a trap having an electrode grid surrounding an insect attracting element, such as a light. As the insects attempt to reach the light, they encounter the electrodes which shorts out through the insects body, thereby electrocuting the insect. The voltage and current is sufficiently high, so that in killing the insect, the body is substantially burned, and in some cases totally obliterated. So much power is used to operate the device, light for attracting and charge for electrocuting the insect, that the device can only be used by utilizing conventional house current. The use of a storage battery would be totally impractical. Also, the voltage and current are sufficiently high to cause a hazzard for anyone touching the electrode grid, so that a protective cage is provided about the electrode grid. The electrical insect exterminators are limited to flying insects which would include gypsy moths as well as the moths of other caterpillars or larval insects which turn into flying insects. However, these devices are ineffective to protect an individual tree or other structure from a crawling insect, such as a caterpillar. These and other difficulties experienced with the prior art devices have been obviated in a novel manner by the present invention.

It is, therefore, an outstanding object of the invention to provide an insect exterminator which is highly effective for killing all insects which attempt to ascend or descend a structure to which the exterminator is applied.

Another object of this invention is the provision of an insect exterminator which prevents accumulation of dead insects that might otherwise impair the effectiveness of the exterminator.

A further object of the present invention is the provision of an insect exterminator which kills insects through the use of electricity and which prevents crawling insects from ascending or descending a structure.

It is another object of the instant invention to provide an insect exterminator which uses electricity as the killing agent in a manner which is not harmful to humans or pets that may accidentally come into contact with the exterminator.

A still further object of the invention is the provision of an insect exterminator which uses electricity as the killing agent in a manner which utilizes the electrical power efficiently to allow a storage battery to be used as the source of electrical power.

It is a further object of the invention to provide a insect exterminator which uses electrical power from a storage battery in which the low voltage of the storage battery is transformed and pulsed to a high voltage spark which is sufficient to kill the insect without wasting electrical power to obliterate the insects body.

It is a further object of the invention to provide an insect exterminator which includes spaced bands of electrodes attached to a base sheet of insulating material which surrounds the structure to be protected and means for creating a high voltage spark across the electrodes only when an insect attempts to cross the electrodes by utilizing the insects body as a conductor to draw the spark.

It is a further object of the invention to provide an insect exterminator which is easy to install and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of an insect exterminator having a base sheet of electrical insulating material adapted to completely encircle a structure to be protected, a source of electrical power, a first electrical contact extending along the entire length of the base sheet and a second electrical contact spaced from the first contact and extending along the entire length of the sheet. The first and second electrical contacts are connected to the source of electrical power and the space in between the two contacts are sufficient to normally prevent completion of a circuit across the contacts and for completion of a circuit through an insects body as the insect attempts to traverse the contacts.

Most specifically, the electrical contacts are embedded in the base sheet except for a limited exposed areas on the side of the sheet which faces away from the structure about which the sheet is applied. The power is supplied by a low voltage DC battery and means is provided for converting the low voltage current of the battery to a pulsing high voltage current at the electrodes.

BRIEF DESCRIPTION OF THE DRAWINGS

The character of the invention, however, may be best understood by reference to one of its structural forms, as illustrated by the accompanying drawings, in which:

FIG. 2 is a fragmentary elevational view of the portion of the exterminator which is applied to the structure to be protected and which contains the electrical contacts, FIG. 3 is a vertical sectional view of the insect exterminator taken on the line III—III of FIG. 2, FIG. 4 is a horizontal sectional view of the insect exterminator taken on the line IV—IV of FIG. 1.

DESCRIPTION OF THE PREFERRED EMBODIMENT

Figure 1:
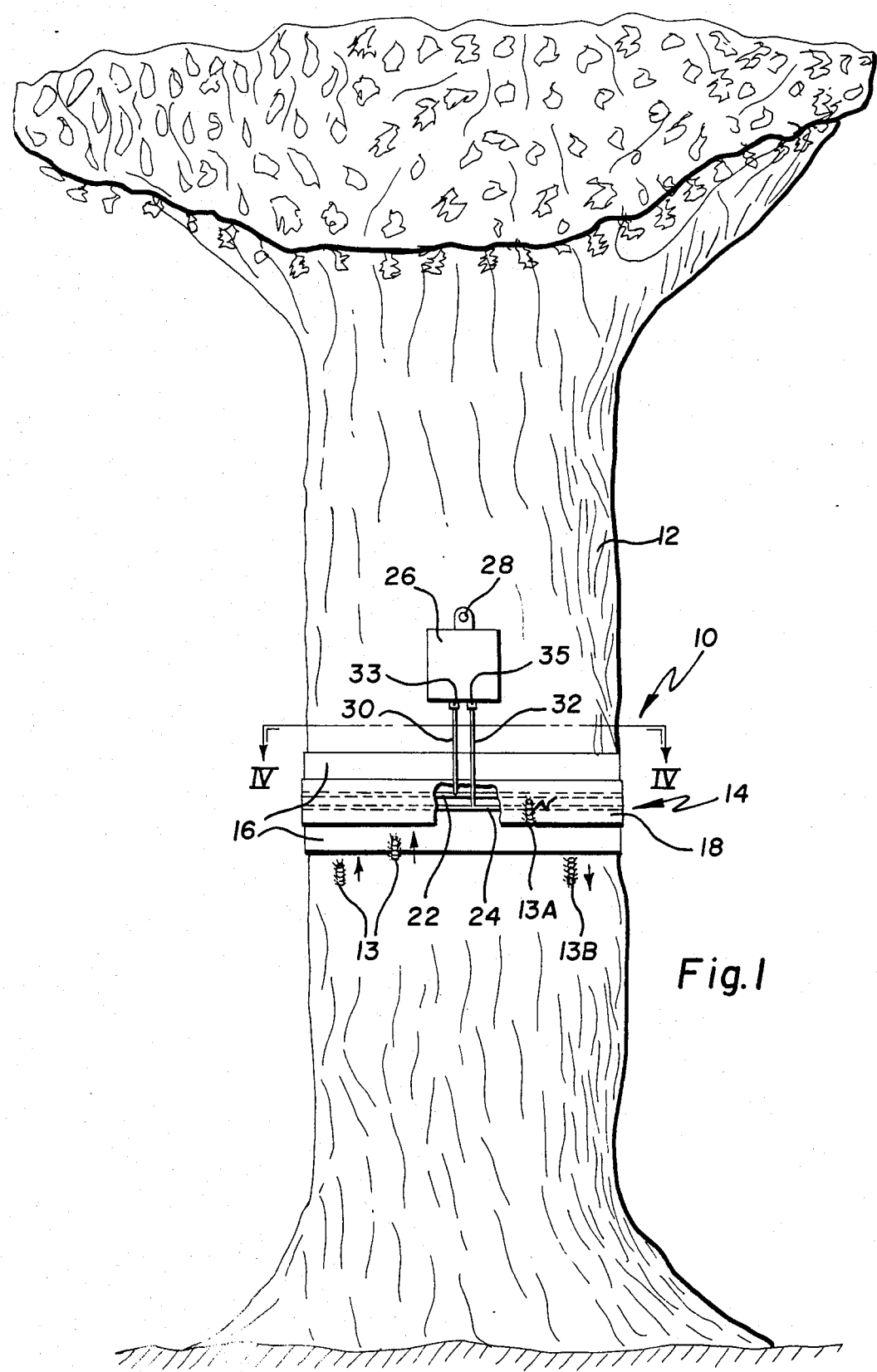
FIG. 1 is a diagrammatic elevational view of the invention in use.

Referring first to FIGS. 1-4, the insect exterminator embodying the features of the present invention is generally indicated by the reference numeral 10 and is shown applied to the trunk 12 of a tree which is to be protected from insects such as caterpillars 13. The insect exterminator 10 includes a planar base sheet, generally indicated by the reference numeral 14 which is applied to the trunk of the tree and completely encircles the tree, as shown in FIG. 4. The base sheet 14 comprises a primary layer 16 which is adapted to lie against the outer surface of the tree trunk and a secondary layer 18 which is attached to the outer surface of the primary layer 16. The primary and secondary layers 16 and 18, respectively, are made of electrically insulating material, such as plastic. The secondary layer 18 is provided with a plurality of apertures 20, along its entire length. First and second elongated electrical contacts 22 and 24, respectively, are located between the primary and secondary layers 16 and 18, respectively. The first and second contacts 22 and 24 are spaced from each other and extend along the entire length of the base sheet 14.

An electrical control unit 26 is mounted to the tree trunk 12 by means of a fastener 28, preferably at a location above the base sheet 14, as shown in FIG. 1. The control unit 26 contains a source of electrical power and control elements to be described. First and second leads 30 and 32 connect the control unit to the first and second electrical contacts 22 and 24, respectively. The apertures 20 enable a circuit to be completed across the contacts 22 and 24, through an insects body as shown in FIG. 3. The voltage at the contacts is sufficiently high, as will be described in detail, so that the insect does not actually have to touch the contacts to complete a circuit thereacross.

Figure 5:
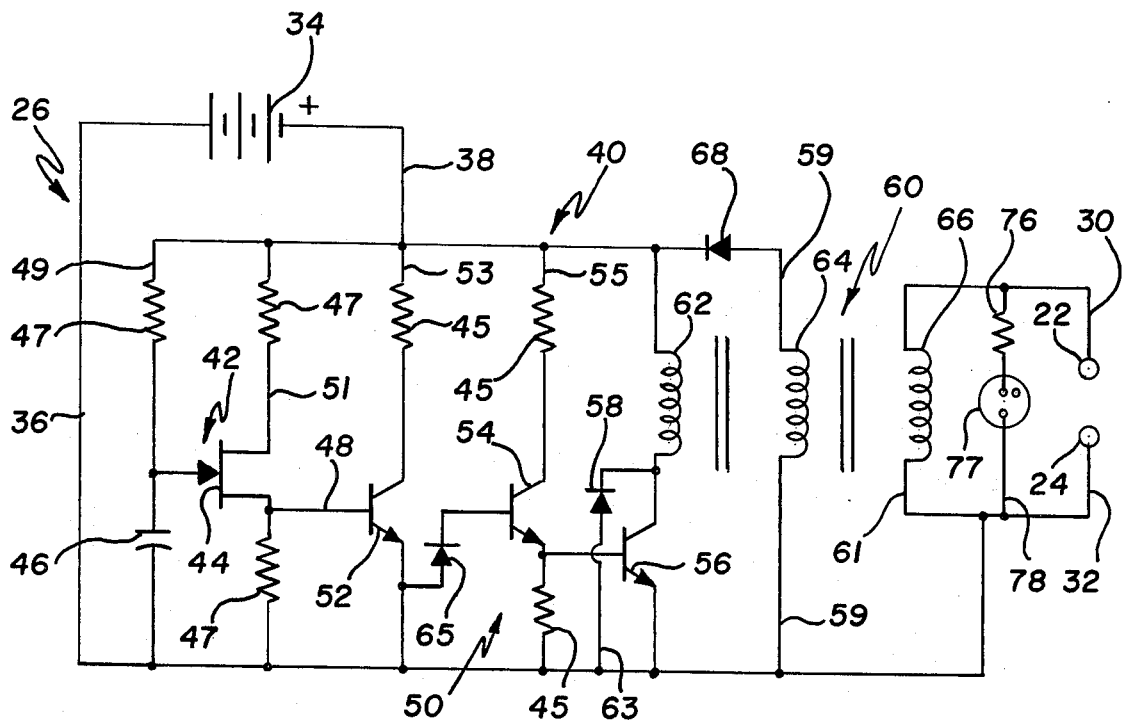
FIG. 5 is a schematic view of the electrical control portion of the insect exterminator.

Referring to FIG. 5, the electrical control unit 26 includes a DC low voltage storage battery 34, six volts for example. The negative side of the battery 34 is connected to a ground line 36 which is connected to the lead 32. The positive side of the battery is connected to the power line 38 and the control circuitry, generally indicated by the reference numeral 40, extends between the lines 36 and 38. The control circuitry 40 includes a timing circuit, generally indicated by the reference numeral 42, which comprises a unijunction transistor 44 on a line 51 and a capacitor 46 on a line 49. Appropriate current limiting resistors 47 are also located on lines 49 and 51 as shown in FIG. 5. The timing circuit 42 transmits an electrical pulse to a line 48. One pulse is generated each second and lasts for 800 microseconds. However, the pulse has a very low current and must be amplified by means of an amplifier circuit, generally indicated by the reference numeral 50, connected to the line 48. The amplifier circuit 50 includes a first stage transistor 52, a second stage transistor 54 and a third stage transistor 56. The transistors 52, 54, and 56 are located on lines 53, 55, and 57, respectively. Appropriate current limiting or biasing resistors 45 are located on lines 53 and 55 as shown in FIG. 5. The transistors 52, 54, and 56 progressively amplify the pulse which is generated by the pulsing circuit 42. The voltage of the pulse is amplified by means of a transformer circuit, generally indicated by the reference numeral 60 which includes a primary winding 62, located on a line 57. The transformer circuit 60 also includes a secondary winding 64 on a line 59 and a third winding 66 located on a line 61. The voltage across the second winding 64 is approximately 20 volts and the voltage across the third winding 66 is approximately 1500 to 1700 volts. However, the third winding 66 is connected to the leads 30 and 32 and is normally maintained in the deenergized state since the circuit across the contacts 22 and 24 is normally open. The coil 66 becomes charged only when current is drawn across the contacts 22 and 24 when an insect attempts to cross the contacts. When no current is being drawn across the contacts 22 and 24, the electrical pulse across the secondary winding 64 is dumped back into the battery 34 by means of a diode 68, located on the positive side of the line 59. A line 63 extends between the primary winding 62 and the transistor 56 to the ground line 26. The line 63 contains a diode 58 which protects the transistor 56 from the relatively high voltage pulse which is dumped back into the battery from the secondary winding 64. The transistors 52 and 54 are protected by a diode 65 on the line 55. A neon bulb 77 together with a limiting resistor 76 is located on a line 78 which extends parallel with the third winding 66. The bulb 77 draws a negligable amount of current from the transformer circuit 60 and lights up for each electrical pulse transmitted to the transformer circuit. The bulb 77 serves as a visual indicator that the exterminator 10 is functioning properly. Most of the current at the winding 64 is dumped back into the battery as described above for each pulse for which there is no current drawn across the contacts 22 and 24.

The operation and advantages of the present invention will now be readily understood in view of the above description. The base sheet 14 is supplied in a roll with a plurality of leads 30 and 32, extending from the sheet at spaced intervals or is supplied as a single sheet with one pair of leads 30 and 32 and having a sufficient length to completely encircle a large tree.

Whether the base sheet 14 is supplied in a roll form or as a single sheet, a length of the base sheet is applied to the tree 12 to be protected, so that the sheet completely encircles the tree. The sheet is attached to the tree by any desired means, such as tacks or adhesive tape. The sheet 14 is preferably applied so that the ground contact 24 is below the contact 22 and the pair of leads 30 and 32 extend upwardly. The lead 30 is connected to a positive terminal 33 and the lead 32 is connected to a negative terminal 35, both of which are located at the base of the control unit 26, as shown in FIG. 1. The insect exterminator 10 is now ready for operation.

As insects, such as caterpillars 13, climb up the trunk of the tree, they climb onto the base sheet 14 and attempt to cross the contacts 22 and 24. When this occurs, the insect's body completes a circuit across the contacts 22 and 24, thereby causing the third winding 66 to be fully energized. Since the current across the transformer circuit 60 is pulsed and is at a high voltage, the current flow across the contacts 22 and 24 is in the form of a single spark. The spark, indicated by the reference numeral 80 in FIG. 3, arcs from the contact 22 to the caterpillar indicated as 13a in FIGS. 1 and 3, which acts as a conductor. Because of the high voltage, the caterpillar does not have to touch either of the contacts 22 and 24. The caterpillar only has to bridge the gap between contacts 22 and 24, so that a spark can arc from the contact 22 through one of the holes 20 to the caterpillar.

The exterminator 10 is effective to kill insects which are ascending or descending a tree or other structure. However, it is primarily designed to kill insects which are ascending. Since the spark 80 jumps from the contact 22 to the insects body, the ascending insect will be struck in the head as indicated by caterpillar 13a in FIG. 3, instantly killing the insect. The jolt to the insects head causes the insect to recoil backwards and fall, as indicated by caterpillar 13b in FIG. 1. This prevents the caterpillar from remaining on the base sheet in a death grip to clog the sheet and to incur unnecessary additional jolts which would incur an unnecessary drain on the battery 34. Since the caterpillar encounters the ground contact 24 first as it is ascending the tree, it will not sense a tingle when it first encounters the contact 24, if a caterpillar were being electrocuted at another location at that instant. By energizing the contacts 22 and 24 only when an insect bridges the contact and by killing the insect with a single spark, the power in the battery 34 is utilized to its maximum efficiency. This greatly extends the life of the battery and enables it to be used for several days before the battery has to be replaced, even during peak periods where insects are being continually killed.

Although it is contemplated that the invention has its greatest utility for killing gypsy moth caterpillars, it is also effective against other caterpillars, cankerworms, ants, inch worms, and other injurious insects which climb trees or other structures. For example, gypsy moth caterpillars have been known to climb houses in great numbers. Although the caterpillars do not eat the house, they represent a nuisance to the home owner.

Figure 6:
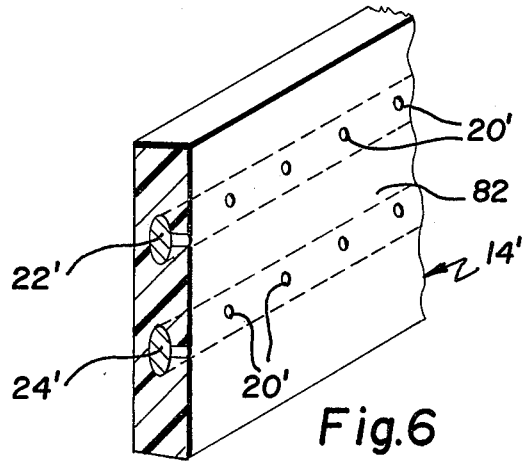
FIG. 6 is a first modified base sheet.

Referring to FIG. 6, there is shown a first modified base sheet, generally indicated by the reference numeral 14'. The base sheet 14' consists of a single layer of electrical insulating material, such as plastic within which is embedded contacts 22' and 24'. The sheet 14' has an outer surface 82 which is adapted to face away from the structure to which the sheet is applied and which contains apertures 20' which extend down to the contacts 22' and 24'. The contacts 22' and 24' are also provided with leads, not shown, such as leads 30 and 32 of the preferred embodiment for connecting the sheet to the control unit.

Figure 7:
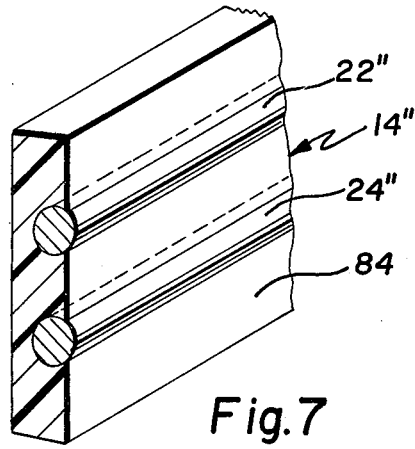
FIG. 7 is a second modified base sheet.

Referring to FIG. 7, there is shown a second modified sheet generally indicated by the reference numeral 14" which comprises a single layer of electrical insulating material, such as plastic. A pair of contacts 22" and 24" are embedded into the sheet 14" to a sufficient depth, so that they are mechanically locked into the sheet, however, a small portion of the outer surface of each contact 22 and 24' is exposed along the outer surface 84 of the sheet. The contacts 22" and 24" are also provided with leads, not shown for connecting the sheet to the control unit.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Insect exterminator comprising:
   (a) a planar base sheet of electrical insulating material adapted to completely encircle a structure upon which the insects to be exterminated are traveling,
   (b) a low voltage DC battery,
   (c) a pulsing circuit connected to the battery for producing low voltage pulses,
   (d) a transformer circuit connected to said pulsing circuit for converting said low voltage pulses to high voltage pulses,
   (e) a first elongated electrical contact connected to said transformer circuit, said first contact being attached to and extending along the entire length of the base sheet, and
   (f) a second elongated electrical contact connected to said transformer circuit, said second contact being attached to and extending along the entire length of said base sheet so that it is spaced from the first contact, said spacing being sufficient to normally prevent completion of a circuit across said contacts and for completion of a circuit across said contacts through an insect's body as the insect attempts to traverse the contacts.

2. Insect exterminator comprising:
   (a) a planar base sheet of electrical insulating material adapted to completely encircle a structure upon which the insects to be exterminated are traveling, said base sheet having a primary layer adapted to lie against said structure, and a secondary layer attached to the primary layer and overlapping the first and second contacts so that the contacts lie between the primary and secondary layers, said secondary layer having a plurality of apertures which expose portions of the first and second contacts, (b) a source of electrical power, (c) a first elongated electrical contact connected to said source of electrical power, said contact being attached to and extending along the entire length of the base sheet, and (d) a second elongated electrical contact connected to said source of electrical power, said second contact being attached to and extending along the entire length of said base sheet so that it is spaced from the first contact, said spacing being sufficient to normally prevent completion of a circuit across said contacts and for completion of a circuit across said contacts through an insect's body as the insect attempts to traverse the contacts.

3. Insect exterminator comprising:

(a) a planar base sheet of electrical insulating material adapted to completely encircle a structure upon which the insects to be exterminated are traveling, (b) a first elongated electrical contact attached to and extending along the entire length of the base sheet, (c) a second elongated electrical contact attached to and extending along the entire length of said base sheet so that it is spaced from the first contact, (d) a low voltage DC battery, (e) a pulsing circuit connected to the battery for producing low voltage pulses, and (f) a transformer circuit connected to said pulsing circuit and the first and second contacts for converting said low voltage pulses to high voltage pulses and for transmitting said high voltage pulses to the contacts only when a circuit is completed across said contacts, the spacing between said first and second contacts being sufficient to normally prevent completion of a circuit across said contacts and for completion of circuit across said contacts through an insect's body as the insect attempts to traverse the contacts.

* * * * *